United States Patent Office 2,950,375
Patented Aug. 23, 1960

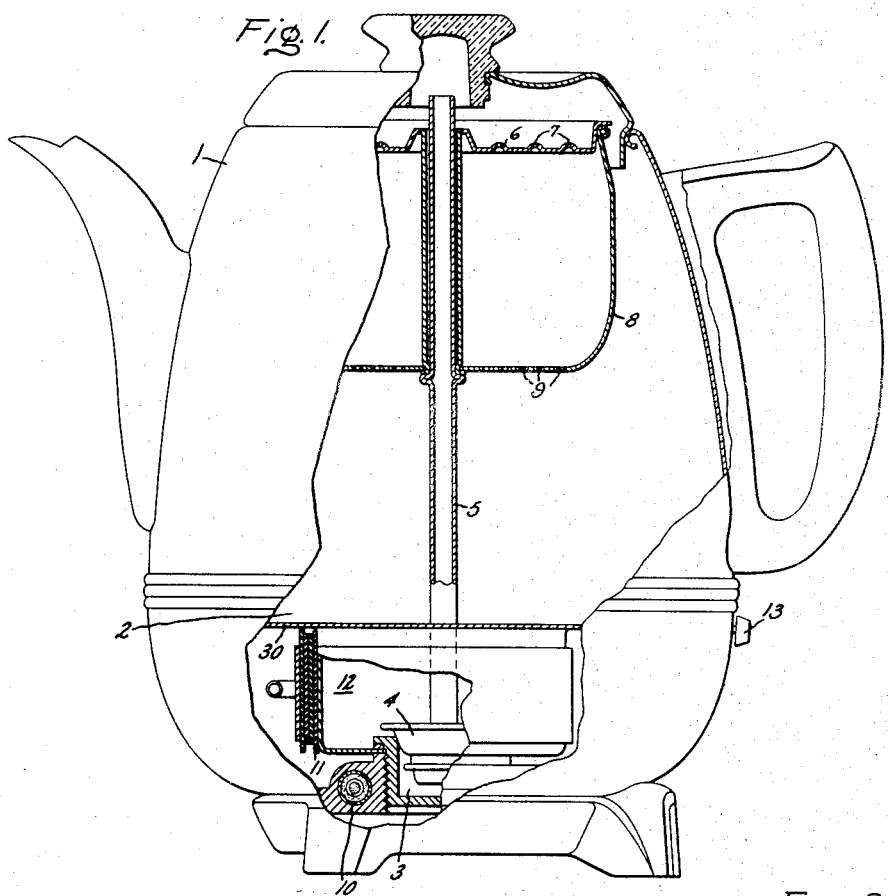
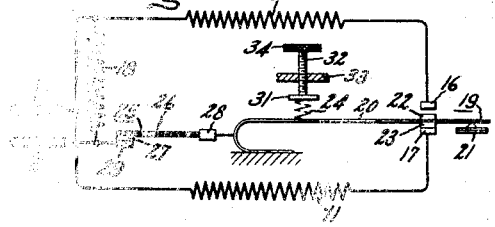
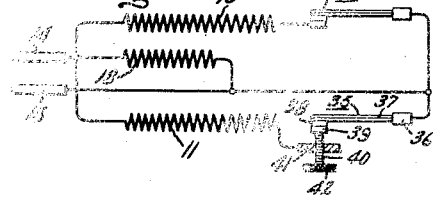
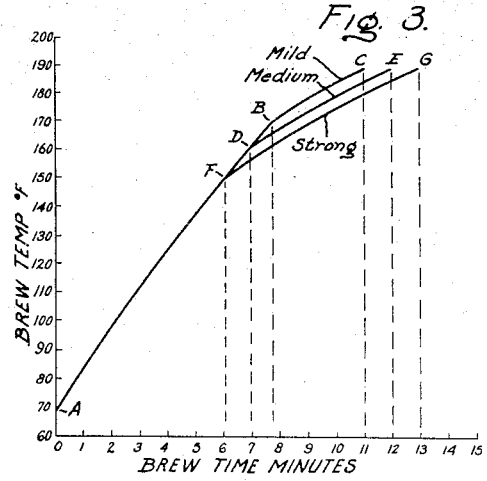

2,950,375
PERCOLATOR BREW STRENGTH CONTROL

Earle C. Sullivan, Nichols, Conn., assignor to General Electric Company, a corporation of New York Filed Apr. 23, 1954, Ser. No. 425,287

9 Claims. (Cl. 219—44)

My invention relates to electric percolators and more particularly to arrangements for varying the strength of the coffee.

Automatic electric percolators are conventionally provided with heating means for heating the water in the container and causing it to be pumped upwardly through the fountain tube and then to flow downwardly over the coffee in the basket of the percolator. This perking operation is discontinued in some automatic manner, as by timer or by a thermostat responsive to the temperature of the brew. Some automatic percolators are also provided with adjustable means for varying the strength of the brew obtained from the percolator. This may be obtained for example by providing for adjusting the temperature at which the perking action is discontinued.

It is desirable also to provide in an automatic percolator an arrangement for securing a rapid heating of the water in the percolator receptacle so as to shorten the time required for completing the brewing of the coffee. By my invention I have provided an arrangement in which by simple structure there is obtained both a rapid heating of the water in the receptacle and also a simple adjustment of the strength of the brew.

It is an object of my invention to provide a coffee percolator including an improved arrangement for adjusting the strength of the brew.

It is another object of my invention to provide a coffee percolator which includes means for rapidly heating the water during the initial period of the brewing cycle so as to shorten the brewing time.

It is a further object of my invention to provide a circuit which conveniently achieves the multiple objective of rapid heat up of the liquid and adjustability of the brew strength.

It is still another object of my invention to provide an improved coffee percolator in which warm as well as cold water may be employed.

Further objectives and advantages of my invention will become apparent as the following description proceeds and the features of novelty which characterize my invention will be pointed out with particularity in the claims annexed to and forming a part of this specification.

For a better understanding of my invention, however, reference may be had to the accompanying drawing in which Figure 1 is an elevation view, partly broken away, showing a coffee percolator incorporating an embodiment of my invention.

Figure 2 is a diagram of the control circuit for the heating units of the percolator.

Figure 3 is a chart showing the relationship of temperature and brew time for various settings of the brew control.

Figure 4 is a diagram showing a modified control circuit for the heating units.

In carrying out the objects of my invention the control circuit is arranged so as to provide high wattage heating for the coffee percolator during the first or heat-up portion of the brewing cycle and a lower wattage heating for the latter or perking portion of the brewing cycle. This allows the liquid to be brought up rapidly to the perking temperature thereby cutting the overall time required to make the coffee. Further, in carrying out the objects of my invention, means is provided for adjusting the temperature at which the shift is made from high wattage heating to low wattage as will be pointed out in detail later. By varying the temperature at which this shift is made the length of time required to bring the brew up to the final cut-off temperature and hence the length of time during which perking takes place is varied. Thereby a variation in the strength of the brew is obtained.

In Figure 1 there is shown a coffee percolator 1 which includes a water receptacle 2 and a pump well 3. A pump 4 is provided on the lower end of a fountain tube 5 through which water is pumped to the spreader 6. The spreader 6 is provided with a plurality of holes, some of which are shown at 7, through which water flowing thereon passes into the coffee basket 8. The water passes over the grounds in the basket extracting the coffee therefrom and flowing downwardly through holes 9 in the bottom of the basket to the receptacle 2.

In order to heat the liquid in accordance with my invention two heating units 10 and 11 are provided. The heating unit 10, which may conveniently be of the sheathed conductor type sold under the trade name "Calrod," is provided adjacent to the well 3 and is effective in pumping water from the well through the fountain tube 5. The heating unit 11 is arranged about the circumference of a depending chamber 12 at the bottom of the receptacle 2 and provides heat primarily in the initial cycle of the coffee making operation to bring the water in the receptacle 2 to an elevated temperature. A lever 13 is shown extending from one side of the percolator and it is intended that lever will be connected in any conventional manner to adjust the temperature at which a temperature responsive element effects de-energization of the heating unit 11.

The control circuit for effecting the desired automatic operation of the percolator is shown schematically in Figure 2. Current is supplied from any suitable source to the circuit through the terminals 14 and 15. Included in this circuit is a heating unit 10 which is a schematic illustration of the pump heating unit 10 shown in Figure 1 and a booster heating unit 11 which is a schematic illustration of the heating unit 11 shown in Figure 1. The circuit may also include a keep-warm heating unit 18 of low wattage connected across the terminals 14 and 15. As shown one end of each of these heating units is connected to one terminal 14. The other end of the pump heating unit 10 is connected to a contact 16, and the other end of the booster heating unit 11 is connected to a second contact 17.

In order to control the energization of the heating units 10 and 11 a temperature responsive switch 19 is provided. In the form illustrated the temperature responsive switch includes a resilient blade or strip 20 arranged to be actuated by a bimetal strip 21. In the form shown the bimetal strip 21 extends transversely of the resilient blade 20 and is constructed so as to move upwardly, thereby lifting the end of the blade 20, as the temperature increases. On opposite sides of the blade 20 and in alignment with the contacts 16 and 17 there are provided contacts 22 and 23. The blade 20 is biased by a compression spring 24 toward a position wherein contact 23 engages the contact 17, thereby providing a circuit from the terminals 14, 15 through the booster heating unit 11. Similarly when the temperature responsive bimetal strip 21 has raised the blade 20 sufficiently to cause engagement of the contacts 16 and 22, the circuit is completed from the terminals 14, 15 through the pump heating unit 10.

Both of these circuits are completed through a temperature responsive switch 25, one side of which is electrically connected to the blade 20 in circuit therewith. The temperature responsive switch 25 includes a thermostatic element or bimetal 26 having a contact 27 at the free end thereof. The opposite end of the bimetal 26 is mounted on any suitable support shown diagrammatically at 28. The contact 27 is adapted to cooperate with a fixed contact 29 which is connected electrically with the terminal 15. Both the temperature responsive switch 19 and the temperature responsive switch 25 are positioned in any suitable manner in heat conducting relationship with the bottom 30 of the receptacle 2 of the percolator.

The resistances of the pump heating unit 10 and the booster heating unit 11 are chosen so as to provide a relatively high wattage for the booster heating unit 11 and a lower wattage for the pump heating unit 10. For example, in one embodiment of my invention, I have provided a booster heating unit of 750 watts and a pump heating unit of 300 watts. As indicated previously, at the beginning of the coffee making operation when the liquid in the receptacle 2, to which the thermostatic switches 19 and 25 are responsive, is at a low temperature, the strip or blade 20 is biased by the spring 24 to bring the contacts 17 and 23 into engagement, thereby completing a circuit through the booster, or high wattage, heating unit 11. This provides a relatively fast heating of the liquid in the receptacle 2 to an elevated temperature. As the temperature of the liquid in the container 2 increases, the bimetal strip 21 which is responsive to the temperature of the liquid moves upwardly as viewed in Figure 2, eventually causing a shift of the blade 20 so as to break the engagement between the contacts 17 and 23 and bring the contacts 16 and 22 into engagement. The circuit through the booster, or high wattage, heating unit 11 is thereby broken, and the circuit is completed through the pump, or lower wattage, heating unit 10. While a switch has been shown only diagrammatically in Figure 2, it will be apparent that, if desired to minimize arcing of the contacts, the blade 20 can be provided, in any manner well known in the art, to have a snap action movement from its lower to its upper position.

In order to vary the strength of the brew I have provided an arrangement for varying the temperature at which the bimetal element 21 effects movement of the switch blade 20 from its lower to its upper position. This is also shown diagrammatically in Figure 2. As there illustrated, the switch blade 20 is biased downwardly by the spring 24. One end of the spring 24 bears against the switch blade 20 and the other end bears against a flange 31 on the lower end of an adjustable element 32. The adjustable element 32 includes a threaded rod received in a threaded opening in a support 33. A knurled knob 34 is provided at the other end for turning the adjustable element 32. It will be apparent that the knurled knob 34, shown diagrammatically in Figure 2, corresponds to the knob 13 shown in Figure 1.

As the adjustable element 32 is screwed downwardly increasing the compression of the spring 24 and thereby the downward force or bias on the switch blade 20, the temperature of the liquid in the receptacle 2 must reach a higher point before the bimetal strip 21 can overcome this downward bias and effect opening of the contacts 17, 23 and closing of the contacts 16, 22. Similarly if the adjustable element 32 is screwed upwardly so as to reduce the compression of the spring 24 and thereby decrease the downward bias on the switch blade 20, the bimetal strip 21 will be able to effect opening of the contacts 17, 23 and closing of the contacts 16, 22 at a lower temperature value.

The effect of this adjustment on the coffee strength is shown graphically in Figure 3. As indicated in Figure 3 it is contemplated that the final cut-off temperature at which both the heating units 10 and 11 will have been de-energized is held relatively constant at about 190° F. This is the temperature setting of the thermostatic switch 25. Where mild brew is desired, the adjustable temperature responsive switch 19 may be set to open at a temperature of say 170° F. Under these circumstances, the booster, or high wattage, heating unit 11 remains on through a large portion of the coffee making cycle and the curve of temperature versus time follows the line A—B in Figure 3. Under these circumstances the total brewing time indicated by the chart is something over 10 minutes and the actual perking time somewhat over 3 minutes. If it is desired to obtain a somewhat stronger coffee, for example, then that indicated at "medium" in Figure 3, the adjustable element is moved so as to reduce the bias on the switch blade 20 thereby allowing the bimetal element 21 to open the contacts 17—23 and close the contacts 16—22 at a somewhat lower temperature, indicated for example by the point D on the curve in Figure 3. Thereafter, of course, the high wattage booster heating unit 11 is de-energized and heat is supplied by the low wattage pump heating unit 10. Hence there is a slower rate of change in temperature as indicated by the lower slope of the curve between the points D and E at which latter point the thermostatic switch 25 opens, discontinuing the coffee making operation. By cutting off the energization of the high wattage booster heating unit at the lower temperature indicated at the point D, it is apparent that the total coffee making time is increased to something approaching 12 minutes and the time that the pump heating unit is energized for effecting perking is increased to about 6 minutes. This increased time during which the water is pumped over the grounds in the basket 8 causes, of course, an increase in strength of the brew.

To secure a still stronger brew the adjustable element is moved to reduce still further the bias provided by the spring 24 so that the booster heating unit 11 is de-energized at a still lower temperature indicated for example by the point F on the curve in Figure 3. Thereafter the curve follows a gentler slope indicated by F—G since heat is being supplied at a much lower rate by the lower wattage pump heating unit 10. With this setting the brew does not reach the cut-off temperature of the thermostatic switch 25 until the expiration of something over 13 minutes and the pump heating unit is energized for about 9 minutes. Again the increase in the time during which water is supplied over the grounds in the basket 8 results in a stronger brew. Of course, all those times are given merely as examples for comparative purposes, and will vary with different sizes of heaters, quantities of water, etc.

It can be seen that by this arrangement I have provided for a rapid heat-up of the liquid in the receptacle 2 through the use of the high wattage booster heating unit during the early part of the coffee making cycle, thereby reducing the total coffee making time. At the same time I have provided for an adjustment used in connection with this shift from the high wattage to the low wattage unit which provides a simple adjustment for varying the strength of the brew obtained.

Since with the circuit shown in Figure 2, the pump heating unit 10 is not energized until the switch 19 is actuated to the upper position, perking action does not begin until the switch is actuated. Since the lowest point for actuation of the switch may be set at say 150° F. and since hot water from the ordinary hot water heater is usually not higher than 140° F., hot water from the faucet may be used for the percolator with no effect in the brew strength. Where the pump heating unit is energized at the beginning of the cycle and perking action therefore begins early, use of hot water, by reducing the perking time, somewhat reduces the brew strength below that obtained with the same setting using cold water.

A modified form of my invention is shown in Figure 4. Corresponding parts are indicated by the same numerals as indicated in Figures 2 and 4. Referring to Figure 4 the circuit there shown includes terminals 14 and 15 for connecting the circuit to any suitable source of power. The circuit includes a pump heating unit 10, a booster heating unit 11 and a keep-warm unit 18. The pump heating unit 10 is connected to the terminals 14, 15 through a thermostatic switch 25 adapted to de-energize the pump heating unit at a predetermined temperature, for example, 190° F. as shown in Figure 3. The booster heating unit 11 is controlled by a thermostatic switch 35 which corresponds to the thermostatic switch 19 in Figure 2. This switch is shown diagrammatically in Figure 4 as including a support 36 for one end of a bimetal thermostat blade 37. The free end of the thermostatic blade 37 includes a contact 38 adapted to cooperate with a contact 39. As shown, the contact 39 is mounted on the end of an adjustable member 40, corresponding to the adjustable member 32 in Figure 2. The adjustable member 40 includes a threaded rod adapted to have threaded engagement with an opening in a support 41. A knurled knob 42 is provided for moving the adjustable member 40 to change the position of the contact 39 relative to the bimetal strip 37.

The bimetal strip 37 is arranged to move upwardly as its temperature increases, eventually moving the contact 38 to break the circuit through the booster heating unit 11. When it is desired to increase the strength of the brew, the adjustable element 40 is moved to lower the contact 39 thereby lowering the temperature at which the contact 38 is moved by the bimetal strip 37 to break the circuit between contacts 38 and 39. As explained previously in discussing Figure 3 this increases the total perking time and thereby increases the strength of the brew. Conversely, if it is desired to decrease the strength of the brew, the adjustable element 40 is turned to move the contact 39 upwardly so that the thermostatic switch 35 opens at a higher temperature, thereby decreasing the total percolating time.

While I have shown and described specific embodiment of my invention I do not desire that my invention be limited to the particular structure shown and described and I intend, by the appended claims, to cover all modifications within the spirit and scope of my invention.

What I claim as new and desire to secure by Letters Patent in the United States is:

1. A percolator comprising: a liquid receptacle, means in said receptacle for percolating a coffee brew, said percolating means including a pump, a pump chamber, and a pump chamber heating unit, said percolating means being operative when said pump heating unit is energized to continuously circulate liquid through said receptacle and said pump chamber, a booster heating unit for heating liquid in said receptacle, a first thermostat for controlling energization of said pump heating unit, said first thermostat arranged to respond to the temperature of the liquid in said receptacle and to de-energize said pump heating unit and thereby terminate operation of said percolating means at a predetermined temperature, a second thermostat for controlling energization of said booster heating unit, said second thermostat arranged to respond to the temperature of the liquid in said receptacle and to de-energize said booster heating unit at a temperature below that at which said first thermostat de-energizes said pump heating unit, said pump heating unit and said booster heating unit being so related in heat capacity that de-energization of said booster heating unit effects a substantial reduction in heat supplied to said receptacle, and means for varying the strength of the coffee brew by varying the length of time that said pump heating unit is energized, said last named means including means for adjusting said second thermostat to vary the temperature at which said second thermostat de-energizes said booster heating unit.

2. A percolator comprising: a liquid receptacle, means in said receptacle for percolating a coffee brew, said percolating means including a pump, a pump chamber, and a pump chamber heating unit, said percolating means being operative when said pump heating unit is energized to continuously circulate liquid through said receptacle and said pump chamber, a booster heating unit for heating liquid in said receptacle, a first thermostat for controlling energization of said pump heating unit, said first thermostat arranged to respond to the temperature of the liquid in said receptacle and to de-energize said pump heating unit and thereby terminate operation of said percolating means at a predetermined temperature, a second thermostat arranged to respond to the temperature of the liquid in said receptacle and to energize either said pump heating unit or said booster heating unit, said second thermostat being arranged to initially energize said booster heating unit and to simultaneously de-energize said booster heating unit and energize said pump heating unit at a predetermined temperature of said liquid, and means for varying the strength of brew by varying the length of time that said pump heating unit is energized, said last named means including means for adjusting said second thermostat to vary the temperature at which said second thermostat de-energizes said booster heating unit and energizes said pump heating unit.

3. A percolator comprising: a liquid receptacle, means in said receptacle for percolating a coffee brew, said percolating means including a pump, a pump chamber, and a pump chamber heating unit, said percolating means being operative when said pump heating unit is energized to continuously circulate liquid through said receptacle and said pump chamber, a booster heating unit for heating liquid in said receptacle, a first thermostat for controlling energization of said pump heating unit, said first thermostat arranged to respond to the temperature of the liquid in said receptacle and to de-energize said pump heating unit and thereby terminate operation of said percolating means at a predetermined temperature, a second thermostat for controlling energization of said booster heating unit, said second thermostat arranged to respond to the temperature of the liquid in said receptacle, said thermostats arranged to energize both said booster heating unit and said pump heating unit during the initial part of the coffee brewing operation, said second thermostat being arranged to deenergize said booster heating unit at a temperature below that at which first thermostat de-energizes said pump heating unit whereby only said pump heating unit is energized during the terminal part of the coffee brewing operation, and means for varying the strength of the brew, said last named means including means for adjusting said second thermostat to vary the temperature at which said second thermostat effects de-energization of said booster heating unit.

4. A percolator as defined in claim 1 wherein said first thermostat de-energizes said pump heating unit at a substantially fixed temperature.

5. A percolator as defined in claim 1 wherein said adjusting means includes a manually operable member that is accessible from the exterior of the percolator.

6. A percolator as defined in claim 1 which further includes a separate "keep-warm" heating unit that is energized after both said booster heating unit and said pump heating unit are de-energized.

7. An electric percolator comprising a vessel having a bottom wall, a coffee infusion basket disposed in the upper portion of said vessel, a steam-actuated percolating pump having the characteristic of increasing in pumping rate with increase in water temperature, said pump having a pumping chamber and a fountain tube, said tube having its lower end in communication with said pumping chamber and its upper end in communication with said basket, a low wattage heater and a high wattage heater, switch means for rendering said heaters jointly operable to initiate a coffee making period, said period including an initial portion in which said pump operates at less than maximum efficiency, said low wattage heater being disposed adjacent said chamber for actuating said pump, said high wattage heater being disposed for heating water contained within said vessel to a predetermined temperature, whereby said initial portion of said coffee making period is shortened and said pump is operable at substantially its maximum rate for a greater portion of said period, and thermostatic means arranged to respond to the temperature of said water for de-energizing said high wattage heater in response to said predetermined water temperature, said low wattage heater thereafter continuing alone to complete the coffee making period.

8. An electric percolator structure comprising a vessel for containing a liquid and having a bottom wall, an infusion basket disposed adjacent an upper portion of said vessel, a steam actuated percolating pump having a pumping chamber at the bottom of said vessel, a fountain tube having one end in communication with said chamber and its other end in communication with said basket, said pump having means for intermittently admitting liquid from said vessel to said chamber during a percolating period, a first heater disposed at said pump for heating liquid in said chamber to at least partially vaporize the liquid and force it from said chamber through said tube to said infusion basket, a second heater of higher wattage disposed remotely from said pumping chamber for rapidly heating liquid contained in said vessel to a first predetermined temperature during an initial portion of the percolating period, a thermostat arranged to respond to the temperature of liquid in said vessel for deenergizing said second heater when the liquid reaches said first predetermined temperature, means for energizing said first heater subsequent to de-energization of said second heater to operate said pump and further raise the temperature of said liquid to complete a percolating period.

9. An electric percolator structure as described in claim 8 in which said first heater gradually raises the temperature of the liquid in said vessel during a percolating period from said first predetermined temperature to a higher predetermined temperature and thermostatic switch means aramged to respond to the temperature of liquid in said vessel for de-energizing said first heater when the liquid reaches said higher temperature to terminate the percolating period.

References Cited in the file of this patent
UNITED STATES PATENTS

| | | |
|---|---|---|
| 1,702,480 | Newsom | Feb. 19, 1929 |
| 1,778,926 | Wiegand | Oct. 21, 1930 |
| 2,175,727 | Graham | Oct. 10, 1939 |
| 2,287,583 | Weeks | June 23, 1942 |
| 2,329,116 | Heilman | Sept. 7, 1943 |
| 2,577,985 | Willman | Dec. 11, 1951 |
| 2,657,300 | Sullivan | Oct. 27, 1953 |
| 2,694,770 | Sullivan | Nov. 16, 1954 |
| 2,798,143 | O'Brien | July 2, 1957 |